United States Patent
Khalil et al.

[11] Patent Number: 5,891,262
[45] Date of Patent: Apr. 6, 1999

[54] ON-LINE THERMO-CHEMICAL PROCESS FOR THE DEWAXING OF OIL EXPORT PIPELINES

[75] Inventors: Carlos Nagib Khalil; Lúcia Cristina Ferreira Leite; Nelson De Oliveira Rocha, all of Rio de Janeiro, Brazil

[73] Assignee: Petroleo Brasileiro S.A.-Petrobras, Rio De Janeiro, Brazil

[21] Appl. No.: 901,238

[22] Filed: Jul. 25, 1997

[30] Foreign Application Priority Data

Jan. 21, 1997 [BR] Brazil ................................ 9700727

[51] Int. Cl.$^6$ ............................. B08B 7/04; B08B 9/02
[52] U.S. Cl. .......................... 134/22.11; 134/22.13; 134/22.14; 134/40; 166/310
[58] Field of Search .................... 134/22.11, 22.13, 134/22.14, 40; 137/13; 166/310

[56] References Cited

U.S. PATENT DOCUMENTS

| | | | |
|---|---|---|---|
| 3,574,319 | 12/1969 | Morgenthair | 166/310 |
| 3,689,319 | 9/1972 | Sample, Jr. | 134/40 |
| 4,219,083 | 8/1980 | Richardson et al. | 166/400 |
| 4,646,837 | 3/1987 | Kruka | 166/304 |
| 4,673,522 | 6/1987 | Young | 134/22.14 |
| 4,755,230 | 7/1988 | Ashton et al. | 134/22.14 |
| 4,846,277 | 7/1989 | Khalil et al. | 166/300 |
| 5,183,581 | 2/1993 | Khalil et al. | 134/40 |
| 5,484,488 | 1/1996 | Hart et al. | 134/22.13 |
| 5,639,313 | 6/1997 | Khalil | 134/40 |

FOREIGN PATENT DOCUMENTS

| | | | |
|---|---|---|---|
| 2 276 218 | 9/1994 | United Kingdom | E21B 37/06 |
| 2307497 | 5/1997 | United Kingdom | |

*Primary Examiner*—Harold Y. Pyon
*Assistant Examiner*—Saeed Chaudhry
*Attorney, Agent, or Firm*—Sughrue, Mion, Zinn, Macpeak & Seas, PLLC

[57] ABSTRACT

An on-line, thermo-chemical process for the dewaxing of oil export pipelines with the aid of a Nitrogen Generating System is described, wherein the treating fluid to be employed as dewaxing fluid comprises: a) a solution of nitrogen salts activated by emulsified acetic acid and designed to yield nitrogen and heat, and b) a solvent, which is the petroleum oil being produced. The dewaxing treatment is effected at the same time as the petroleum oil is produced, this leading to great savings in costs and energy.

18 Claims, 1 Drawing Sheet

ON-LINE THERMO-CHEMICAL PROCESS FOR THE DEWAXING OF OIL EXPORT PIPELINES

FIELD OF THE INVENTION

The present invention relates to an on-line, thermo-chemical process for the dewaxing of oil export pipelines. More specifically, the present invention relates to an on-line, thermo-chemical process for the dewaxing of large, oil export pipelines, which do not present, or are devoid of, any alternative to the discharge of as-produced oil during the dewaxing treatment. The present dewaxing process is effected with the aid of a Nitrogen Generating System (SGN, from the Portuguese expression Sistema Gerador de Nitrogenio) in the presence of a solvent which is the petroleum oil itself being produced or exported. The production of oil is not interrupted during the dewaxing treatment.

BACKGROUND INFORMATION

Depending on the physical-chemical characteristics of the petroleum oil being exported in subsea lines, there occurs the well-known paraffination phenomenon, with the consequent loss of charge and increasing costs. The paraffin deposition phenomenon basically means the gradual and progressive deposition of paraffin from organic compounds throughout the lines. Thus, produced oils having paraffin contents higher than 3 weight % show high paraffin deposition potential when submitted to the flow conditions and to the characteristics of the subsea flowscheme.

The deposition process is closely related to the low temperatures of the sea bottom, to the temperature gradient set between the oil and the seawater throughout the subsea line, to the flowrates of oil and gas, to the shearing dispersion and to a lesser extent to the gravitational segregation and to the brownian movement. The generation of paraffin crystals is associated to the WAT (Wax Appearance Temperature) defined as ". . . the highest temperature at which is initiated the generation of a solid phase in oil, whenever oil is submitted to a previous thermal treatment and to a controlled cooling rate under isobaric conditions . . ."

U.S. Pat. No. 4,755,230 teaches applying the reaction of heat and nitrogen generation to the dewaxing of hydrocarbon transmission lines with the aid of an oil-in-water emulsion and HCl as an activator of the nitrogen and heat generation reaction. The process requires further an organic solvent added of a crystalline modifier in order to keep as low as possible the cloud point of the parfins in order to avoid their re-precipitation in the line after cooling. The use of the process requires that the paraffin-containing portion of the line be isolated from the rest of the line. The way the process is effected can yield a situation where the paraffinic deposit is simply displaced within the line, without being effectively withdrawn. Also, the direction of the pumping of the treating solution can cause a plug to be formed at one end of the line, so that failure of the line can occur due to excessive pressure.

G-B-B2276218 of the Applicant and herein fully incorporated as reference relates to the dewaxing of lines of up to 4 inches in diameter and 10 km in length, with the aid of a Nitrogen Generating System/Emulsion using acetic acid as a delayed-action activator. The solutions of nitrogen and heat-generating salts are prepared in a process ship, each salt solution being prepared in a separate vessel.

U.S. patent application Ser. No. 08/742,126 of Oct. 31, 1996 of the Applicant and herein fully incorporated as reference relates to the dewaxing of lines of up to 50,000 meters length and internal diameter of up to 12 inches using a Nitrogen Generating System where the delayed-action activator of the reaction of nitrogen and heat generation is a polyadipic anhydride of controlled hydrodegradability. In the process taught in U.S. Ser. No. 08/742,126 the solutions of nitrogen salts are prepared in one single vessel, on the production platform. The salt-containing solution is stabilized by the addition of NaOH and emulsified with an organic solvent. The delayed-action activator is added on flow to the nitrogen salts emulsion. The organic solvent is, for example, kerosene. The requirements of the process comprise emptying or otherwise displacing the whole amount of oil contained in the line. The treating fluid is then pumped into the line, either from a rig, the platform itself or through an auxiliary line; the fluid is allowed to act on the paraffin deposit for the period of time which is required for the development of the chemical reaction between the nitrogen salts and for the fluidization of the deposit. The spent fluids and the emulsified paraffin are recovered and well production is resumed.

Therefore, the state-of-the-art processes either require expensive ship services as in GB-B-2276218 or the interruption of the oil production as in U.S. Ser. No. 08/742,126, this representing serious drawbacks to the economics of the process. Further, those processes cannot be applied to oil export pipelines which are devoid of alternatives of discharge of produced oil during the dewaxing treatment.

Thus, in the art of dewaxing of lines there is the need of a thermal-chemical process using a Nitrogen Generating System for the dewaxing of large dimension oil export pipelines, where the solution of nitrogen and heat-generating salts be mixed with the as-produced oil. This would avoid interrupting the oil production as well as the need of expensive petroleum fractions as solvents, which represents great savings. Such a process is disclosed and claimed in the present invention.

SUMMARY OF THE INVENTION

Broadly speaking, the present invention relates to a thermo-chemical process designed to withdraw, in an on-line manner, wax or paraffin deposits from a hydrocarbon export pipeline with the aid of a Nitrogen Generating System where the thermal chemical effect provided for by the treating fluid causes the thorough contact of the paraffin deposit with the petroleum oil employed as solvent and with the heat and nitrogen chemically generated by the nitrogen reactants.

The on-line, thermal-chemical process for the dewaxing of oil export pipelines with the aid of a Nitrogen Generating System comprises the following steps:

a) determining the WAT (Wax Appearance Temperature) on samples of the as-produced petroleum oil, identifying the paraffination phenomenon as well as the location of same in the oil export pipeline;

b) determining the optimum amount of petroleum oil to be employed as solvent for the paraffininc mass present in the oil export pipeline, so as to dimension the dewaxing operation;

c) preparing heat-and nitrogen gas-generating salt solutions and effecting dewaxing pilot test;

d) preparing an aqueous solution of delayed action activator;

e) continuously pumping, from the production platform to the waxed oil export pipeline, the treating fluid made up of the heat- and nitrogen gas generating salt solutions, petroleum oil and delayed-action activator in the amounts determined in c) so as to effect the dewaxing of the oil export pipeline while petroleum is being produced;

f) after the end of the pumping, collecting in a terminal the spent fluid resulting from the treatment, the paraffin oil and the aqueous spent solution in fluidized form.

In the present invention, which is a thermnal-chemical process for the dewaxing of large-dimension, oil export pipelines using the Nitrogen Generating System SGN, the solution of nitrogen- and heat-generating salts is admixed to the oil being produced without interrupting production. The present process is thus an on-line dewaxing process, which led the Applicants to call it "SGN/ON LINE". The activation of the reaction between the nitrogen salts is attained by the addition of acetic acid or of previously emulsified acetic acid.

Thus, the present invention provides for an on-line, thermal-chemical process for the dewaxing of oil export pipelines, using a Nitrogen Generating System, where the solvent for the paraffins deposited within the pipeline is the petroleum oil being produced or exported.

The present invention also provides for an on-flow, thermal-chemical process for the dewaxing of large dimension, oil export pipelines, the process being effected without interrupting the oil production nor requiring the addition of petroleum fractions as paraffin solvents, with great cost savings.

BRIEF DESCRIPTION OF THE DRAWING

FIG. (I) illustrates the phase diagram of the solvent/paraffin mixture, in case the paraffin solvent is either aviation kerosene as in the state-of-the-art, or the petroleum blend of the present invention. We refer to petroleum blend since the oil used as paraffin solvent in the context of the present invention is a blend or physical admixture of petroleum oils from various wells, for example, three or more wells. FIG. (I) shows that although the pour point of the petroleum-paraffin admixture is a little lower than in the case kerosene is used as solvent, indicating a somewhat lower efficiency of the petroleum blend as paraffin solvent, there is still a great economic advantage in using the produced petroleum oil as solvent.

DETAILED DESCRIPTION AND PREFERRED MODES

Figure 1:
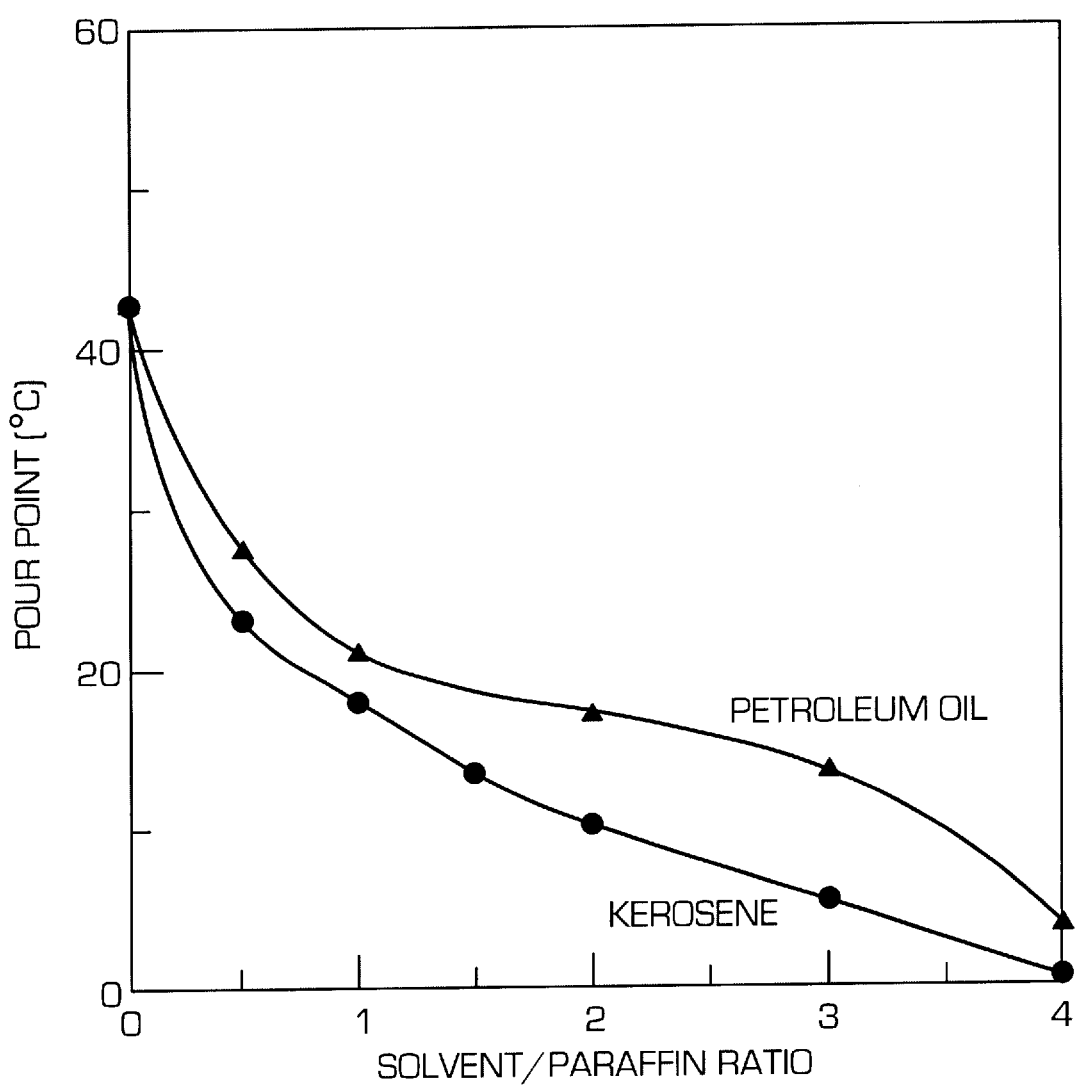

In the specification and claims of the present invention, the dewaxing fluid or treating fluid is that fluid obtained from a solution of nitrogen salts which generate nitrogen gas and heat, such as sodium nitrite and ammonium chloride, or sodium sulfate and ammonium chloride, the reaction of nitrogen and heat generation being triggered with the aid of a delayed-action activator such as acetic acid.

The thermal-chemical process with the aid of Nitrogen Generating System according to the present invention combines the effects of solvency, agitation and heating in order to effectively fluidize the paraffin deposit of oil export pipelines. As stated hereinbefore, the present process is specially directed to oil export pipelines which do not present alternatives to the discharge of oil production during the treatment to be effected.

The present process is directed to the dewaxing treatment of large-dimension, unearthed, earthed or subsea oil export lines, which carry petroleum oil or its fractions, often times under reduced temperatures, for example, temperatures below 10° C.

The nitrogen gas and heat are produced by the reaction between nitrogen salts in the presence of a delayed-action activator.

The solvent employed in the treating fluid is the petroleum oil itself being produced or exported.

As cited hereinbefore, the nitrogen and gas generation results from the reaction between nitrite and ammonium ions which are present in aqueous solutions of those salts.

The nitrogen- and heat-generating aqueous solution contains: a) a compound bearing at least one nitrogen atom to which is attached at least one hydrogen atom, this compound being able of being quickly and exothermally oxidised in acid aqueous solution, thus producing heat, nitrogen gas and by-products which are liquid or dissolved, while being substantially inert to the pipeline; b) at least one oxidizing agent which is able to oxidize the nitrogen compound of a); and c) a buffer system which is able to maintain the pH of the solution at a level around 7.0–7.5.

Among the couples of compounds a) and b) which are useful in the present process, amonium chloride and sodium nitrite or ammonium sulfate and sodium nitrite are specially adequate. In the preferred mode, organic solvent—which in the present process is the very oil being produced—is added to the salt solutions. The aqueous solution of ammonium chloride and sodium nitrite is called "C+N" solution; the aqueous solution of ammonium sulfate and sodium nitrite is called "S+N" solution. The aqueous solution of nitrogen salts is used in a molar concentration of up to 4.5 molar in each of the salts.

The concept of the treatment of oil export pipelines according to the present invention is based on the irreversible fluidization of the paraffin deposit, the fluidization resulting from the simultaneous actions of increasing temperature of the fluid, internal turbulence during the flow, as well as the addition of the paraffin deposit to the petroleum oil employed as solvent of the process.

As used in the present invention, the expression "flow-line" or "production line" means the line which transports the oil from the well to the platform, while the expression "oil export pipeline" means the line which transports oil which has been produced, treated and separated in the platform separator and is being directed to a terminal or a tanker.

Generally, the diameter of the oil export pipeline is larger than that of the production line, for example, 8 inches for the oil export pipeline vs. 4 inches for the production line.

In the present specification, the petroleum oil used as solvent is the blend of petroleum oils collected in several wells, for example three wells. The blend is separated from the gas and formation water in the platform separator and exported through the oil export pipeline.

Also, in th present specification, the expression "the solution of nitrogen salts emulsified in the produced oil" does not mean that there is an emulsifier added to the solution of nitrogen salts. Actually, it is the turbulence created by the nitrogen gas which naturally emulsifies the solution of nitrogen- and heat-generating salts in the petroleum oil (unstable emulsion).

The treating fluid employed in the present thermal-chemical process comprises substantially a solution of nitrogen salts which are ammonium chloride and sodium nitrite or ammonium sulfate and sodium nitrite, emulsified on flow in the produced oil, the produced oil being heated at the exit temperature of the oil-gas separator of the platform. As already mentioned in GB-B-2276218 and U.S. Ser. No.

08/742,126, and herein fully incorporated as reference, the solutions of nitrogen salts emulsified on flow in the produced oil are prepared in concentrations which optimize the production of nitrogen gas and heat as required for the dewaxing treatment. Generally the solution is of up to 4.5 molar for each of the nitrogen salts. One single vessel is used for preparing the nitrogen salts solution. In order to keep the solution stable, the pH is kept between 7.0 and 7.5 with the aid of controlled addition of a NaOH solution.

Further, the present process makes use of the concept of DELAYED-ACTION ACTIVATION, based on the fact that the nitrogen salts do not react per se to produce the desired amount of nitrogen and heat, this requiring an activator. However, it should be pointed out that this activation should not be immediate or instantaneous, since there is the need of reactionless periods between the salts, corresponding to the pumping period of the required volume of the treating fluid. According to the length of the required delay, the delayed-action activator can be either concentrated acetic acid (at 100%) or the concentrated acetic acid is previously emulsified, for example, a water-in-oil emulsion is prepared based on acetic acid, water and an aliphatic hydrocarbon such as pentane, hexane or a petroleum fraction such as diesel oil, and an emulsifier or surface agent.

The delayed-action activator for the reaction of heat- and nitrogen generation can be as taught in U.S. Ser. No. 08/742,126, that is, a polyanhydride of controlled hydrodegradability, which is to be used as a solution. Conventional acetic acid can be used, as stated in GB-B-2276218. Emulsified acids can also be used, as in U.S. Pat. No. 5,183,581.

In one embodiment of the present invention, the reaction can be activated by concentrated acetic acid used in amounts from 0.15 to 0.50 volume % based on the total volume of treating fluid.

In another embodiment, a water-in-oil emulsion can be used, prepared from acetic acid/water/aliphatic hydrocarbon in amounts of from 0.75 to 1.25 volume % based on the total volume of treating fluid.

According to this embodiment, the activator for the reaction of nitrogen salts is a solution of concentrated acetic acid (at 100%) in water in the presence of an aliphatic hydrocarbon which forms a water-in-oil emulsion in the presence of a surface agent. The aliphatic hydrocarbon is a $C_5$ –$C_7$ straight-chain hydrocarbon such as n-pentane, n-hexane or n-heptane, or a petroleum fraction such as diesel oil. The active matter of the activator is acetic acid. The internal or aqueous phase of the emulsion is made up of water and acetic acid in a 1:1 ratio. The external phase or oil phase can be for example diesel oil. The relative amounts of the internal and external phases can be varied in wide limits, provided the necessary stability of the external phase be kept intact. Thus, the lower limit for the amount of external phase is 25 parts per volume, the 75 remaining parts per volume being 37.5 parts of water and 37.5 parts of concentrated acetic acid. In the upper limit, the external phase will contain 75 parts per volume while the internal phase will contain 12.5 parts of water and 12.5 parts of concentrated acetic acid. A preferred volumetric amount to be used as activator is 20 parts water/20 parts acetic acid/ 60 parts diesel oil plus a surface agent.

The amount of activator emulsion to be used is a function of the amount of active matter, that is, acetic acid, present in the emulsion. For example, if the activating emulsion contains a lesser amount of acetic acid, a higher volumetric amount should be used in order to result in a given activation. Thus, an emulsion such as 20 parts water/20 parts acetic acid/60 parts diesel oil used at a 1 volume % of the total volumetric amount of treating fluid corresponds to 0.2% of active matter in the emulsion and delays the reaction between the nitrogen salts for 18 minutes (see Table 4 below).

If the active matter is present in lesser amounts in the activating emulsion, higher volumetric amounts of activator should be added to the treating fluid, yielding longer delaying times caused by the increased stability of the emulsion (see test n°4 on Table 4 below).

A lipophilic surface agent will provide for the desired water-in-oil emulsion of aqueous acetic acid in a hydrocarbon.

Among the lipophilic surface agents which are useful in the present invention, such surface agents based on fatty acids such as sorbitan esters can be used and are widely available. The surface agent used as an emulsifier of the delayed action activator emulsion is present in volumetric amounts of between 0.5 to 1.5 percent based on the volumetric amount of the activator emulsion.

The amount of treating fluid to be used is generally determined based on a first numerical simulation which considers the content and the characteristics of the paraffin to be removed. This simulation generates the thermal log of the flow of oil in the pipe. The thermal log evaluates the severity of the paraffination phenomenon.

A further numerical simulation considers the thermodynamical behavior of the fluid during the dewaxing treatment.

A first step during the research which led to the present process was to determine the thermal and kinetic-chemical behavior of the saturated solution of reactants which make up the Nitrogen Generating System (SGN), that is, ammonium chloride and sodium nitrite (Solution C+N), in the presence of oil previously heated to a temperature near that of the outlet of the oil-gas separator of the platform. In the embodiment which leads to a longer delay for the reaction between the nitrogen salts, the delayed action activator to be used is acetic acid emulsified in water/diesel oil in the presence of a lipophilic surface agent It was found that ammonium sulfate can be advantageously used instead of ammonium chloride, without any harm for the reaction kinetics, the sulfate salt being of very low cost and widely available.

In general terms, the present on-line, dewaxing process for large dimension oil export lines comprises the following sequential steps:

sampling the oil being produced and determining the WAT (Wax Appearance Temperature) with the aid of DSC (Differential Scanning Calorimetry), then making a numerical simulation in order to identify the paraffination phenomenon and its location in the pipeline;

test the efficacy of the produced oil as a solvent for the paraffin in order to determine the optimum ratio of oil to paraffin which is necessary to fluidize the paraffin;

with the aid of a numerical simulation, taylor the deparaffination treatment based on the thermodynamic behavior of the fluid during the paraffination phenomenon;

testing the reaction kinetics on a platform laboratory based on solutions of the heat- and nitrogen gas-generating salts;

from the platform, pumping : a) the treating fluid made up of the nitrogen safts solution, C+N or S+N; b) oil from the separator and c) delayed action activator according to the previously determined amounts;

receiving the paraffin-rich oil and spent fluids into a tanker or terminal. Residual nitrogen gas will be released to the atmosphere while the water from the aqueous salt solutions will be discarded accordingly.

In view of the relationship between WAT (Wax Appearance Temperature) and the paraffin deposition phenomenon, the present study requires that WAT be determined since it is at temperatures below the WAT that the onset of the paraffin deposition phenomenon will occur. The WAT of oils from various wells as well as of the blend of these oils which is to be exported to the terminals after separation from the gas in the platform separator is determined based on kinematic viscosity data. TABLE 1 below lists the data.

TABLE 1

| Temperature (°C.) | KINEMATIC VISCOSITY (mm²/S) | | | |
|---|---|---|---|---|
| | WELL 1 | WELL 2 | WELL 3 | BLEND |
| 2 | 120.9 | 136.7 | 179.2 | — |
| 4 | 97.1 | 114.2 | 148.9 | 244.8 |
| 6 | 71.6 | 94.2 | 118.6 | 187.9 |
| 8 | 58.7 | 80.3 | 100.4 | 127.5 |
| 30 | 15.8 | 23.8 | 27.5 | 29.8 |
| 35 | 12.9 | 19.0 | 22.0 | 23.9 |
| 38 | 11.3 | 16.6 | 19.3 | 21.0 |
| 45 | 8.6 | 12.4 | 14.4 | 16.0 |
| WAT | 12.1 | 13.6 | 14.4 | 15.1 |

Concerning the trend to paraffination exhibited by the various wells, it was found that since the oil export pipeline from well 1 to the platform is not very long, there is no paraffination in spite of the low WAT. However, for the pipelines which transport oil from wells 2 and 3 there is a strong paraffination trend from the second kilometer on of the flexible line. The subsea flowschemes of these wells allow that the oil be cooled below the corresponding WAT's. After the treatment of the oils in the primary separator there is a slight increase in the WAT of the resulting blend (15.1° C.) which, on export through a pipeline of 8 Inch diameter ad 21 km length up to the monobuoy shows a gradual charge loss and consequent loss in flow ability from 2400 to 2000 cubic meters a day. This represents nearly 80% of the originally designed capacity, or a loss of 20%.

Sometimes, there is a reduction in the heating efficacy of the separator, so that the exit temperature of the oil is reduced from 75° C. to 55° C. As a consequence, the oil is rendered more viscous and the flow ability of the oil is again reduced, for example to figures such as 1700 cubic meters a day, which represents 70% of the original daily flow. Thus a temperature corresponding to WAT can be anticipated as a consequence of the lowering in the exit temperature and flowrate of the oil. Thus the process of increasing paraffination in the pipeline is to be expected, mainly in the section situated near the platform.

The chemical characterization of the oils of each of the wells 1, 2 and 3 under study has shown paraffin contents between 3 and 5 weight % and 0.6 to 2.1 weight % asphaltenes which means high organic deposition potential, when these oils are submitted to the flow conditions and to the characteristics of the subsea flowschemes.

TABLE 2 below lists the results for the physical-chemical characteristics of the oils of wells 1, 2 and 3.

TABLE 2

| physical chemical characteristic | KINEMATIC VISCOSITY (mm²/S) | | | |
|---|---|---|---|---|
| | WELL 1 | WELL 2 | WELL 3 | BLEND |
| paraffin content (%) | 4.4 | 3.0 | 4.9 | 4.2 |
| asphaltene content (%) | 0.58 | 1.8 | 2.1 | 1.6 |
| water content (%) | 0.06 | 0.06 | 0.04 | 0.04 |
| Kuop factor (–) | 12.0 | 12.0 | 10.8 | — |
| App. Density (–) | 0.868 | 0.879 | 0.887 | 0.878 |
| API° | 30.8 | 28.8 | 27.3 | — |
| Pour point (°C.) | –15 | –20 | –20 | — |
| WAT (°C.) | 12.1 | 13.6 | 14.4 | 15.1 |

Then, it was necessary to determine if the blend or physical admixture of the petroleum oils being exported through the pipeline could be used as solvent for the paraffin in the process of the present invention—SGN/ON-LINE. It was found that the pour point of the mixture paraffin +oil is reduced in a manner similar to that observed when kerosene, for example aviation kerosene is used as the paraffin solvent. As can be seen from TABLE 3 below, it was found that at usual subsea temperatures in a deep-water environment, the blend of petroleum oils is able to keep a mass of paraffin ($C_{21}H_{44}$ standard) under flow conditions provided there are at least three parts of petroleum oil to each part of paraffin.

This means that petroleum oil, for example, a blend of petroleum oils of various producing wells of a certain field can be easily utilized as an organic solvent in the thermochemical process of the present invention. A further benefit is that the oil leaves the separator at a temperature near 75° C., which represents additional thermal energy to be used in the process.

TABLE 3

| Solvent/ paraffin ratio (g/g) | SOLVENT | | | |
|---|---|---|---|---|
| | KEROSENE | | BLEND | |
| | Melting point (°C.) | Enthalpy (J/g) | Melting point (°C.) | Enthalpy (J/g) |
| 0 | 42.8 | 230 | 42.8 | 230 |
| 0.5 | 23.2 | 126 | 27.7 | 128 |
| 1.0 | 18.0 | 86 | 21.2 | 94 |
| 1.5 | 13.6 | 66 | — | — |
| 2.0 | 10.4 | 56 | 17.4 | 63 |
| 3.0 | 5.7 | 43 | 13.8 | 60 |
| 4.0 | — | — | 4.3 | 30 |

TABLE 4 below lists data of the kinetics of the chemical reaction of the Nitrogen Generation System dispersed in the petroleum blend used as paraffin solvent of the present invention. It was found that the increase in the amount of C+N solution from 10 to 30% by volume promotes an increase in maximum temperature from 79° C. to 100° C., provided the mixture be kept in near-to-adiabatic conditons and activated with acetic acid 0.2%.

TABLE 4

| Composition & Parameters | Test n° | | | | | | |
|---|---|---|---|---|---|---|---|
| | 01 | 02 | 03 | 04 | 05 | 06 | 07 |
| Solution | C + N | C + N | C + N | C + N | C + N | C + N | S + N[3] |
| Vol. % of Solution | 10 | 20 | 30 | 20 | 20 | 20 | 20 |
| Blend (% Vol.) | 90 | 80 | 70 | 80 | 80 | 80 | 80 |
| Initial Temp. (°C.) | 51 | 53 | 51 | 46 | 49 | 51 | 48 |
| Activator | AcOH[2] | AcOH[2] | AcOH[2] | Ac Em[2] | Ac EM[2] | Ac EM[2] | Ac EM[2] |
| Vol. % of Activator | 0,20 | 0,20 | 0,20 | 0,75 | 1,0 | 1,25 | 0,75 |
| Initial pH of Solution | 7,0 | 7,0 | 7,0 | 7,0 | 7,0 | 7,0 | 7,0 |
| Max Temp. (°C.) | 79 | 91 | 100 | 85 | 98 | 98 | 93 |
| Reaction period (min) | 15 | 13 | 12 | 25 | 18 | 14 | 27 |
| Yield N2 (Mole %) | 65 | 89 | 92 | 80 | 88 | 96 | 86 |

[1]Concentrated acetic acid (100%)
[2]Acetic Acid/Water/Diesel oil 20/20/60 emulsion
[3]S + N Solution (4.5 molar)

Data from TABLE 4 show that using 20 vol % of C+N solution in the admixture with the petroleum oil blend, temperatures not higher than 91° C. are attained in 13 minutes reaction period and reaction yields are in the range of 90%, these figures being perfectly acceptable for field operation.

Alternatively, an emulsion of acetic acid in diesel oil stabilized with a lipophilic surface agent was prepared and used as an efficient delayed action activator. This emulsion caused a slightly higher delay (as compared to the acetic acid activator) to the onset of the reaction of heat and nitrogen generation, this being useful to satisfy the requirements of flowrate and pressure of the pipeline. For example, in a concentration of 0.75 volume % the acid emulsion provided for a delay of 18 minutes for the onset of the reaction, while at 1.0 volume % the delay was 18 minutes, and reaction yield was 88 volume %. So the use of acetic acid as delayed action activator, diluted or emulsified, satisfies the requirements of the present invention.

Kinetic data of TABLE 4 show also that the performance of ammonium sulfate is very similar to that of ammonium chloride, so it can be employed instead of ammonium chloride. Ammonium sulfate is a salt of very low cost. It is produced in the area where the tests on oil export pipelines were made.

Thus, based on prior determination of WAT figures, chemical characterization of the oils to be exported, phase diagram of the petroleum oil/paraffin mixture and kinetic data for the chemical reaction between nitrogen and heat-generating salts, one can design the dewaxing operation for the oil export pipeline of a platform in the Campos Basin, Rio de Janeiro, Brazil.

Data of production and subsea flowscheme of the field under study were evaluated according to TABLE 5 below, during the step of designing the dewaxing operation of the oil export pipeline mentioned before. It was found that the significant reductions in production in the field under study are closely related to the wax deposition processes in the production lines in wells 2 and 3 and mainly in the oil export pipeline. It was also noted that the paraffin deposition phenomenon can still be accentuated by the undesirable reduction in the oil temperature at the separator outlet.

TABLE 5

| Producing wells | Well 1, Well 2, Well 3 |
|---|---|
| Producing platform | @ 625 Meters |
| Pipeline | 21000 Meters; @ I.D. 8 in; 32.4 liters/min volumetric capacity |
| Nominal volume | 680 m$^3$ |
| Subsea Monobuoy | @ 173 Meters |
| Monobuoy | @ 0 Meters |
| Flowrate of oil | Initial 2400 m$^3$/day; waxed 2000 m$^3$/day and 1680 m$^3$/day |
| Temp. at the outlet | 75° C. (designed); 55° C. (possible); 75° C. (real) |
| Waxing situation | Pipeline operating at 70% of the designed flowrate and pumping pressure 530 psi; intense waxing presumed, mainly in the first half of the pipeline. |

The hypothesis of heating the oil in the pipeline was considered as a possibility to prevent paraffin deposition in the pipeline. However, in view of the extended length of the pipeline—21,000 meters—this is not feasible. On the other hand, numerical simulations of the flowrate of oil at the various initial temperatures indicate the onset of the waxing phenomenon. If effected, the only action of such heating would be the displacement of the initial location of paraffination towards the monobuoy place.

A preliminary thermal balance involving the step of oil export from the platform to the monobuoy leads to estimating the thermal loss of the mass of oil equivalent to one nominal volume of the pipeline as being of the order of $16 \times 10^6$ Kilocalories.

Based on the above figure for thermal loss of the mass of oil in the pipeline and adding a minimal surplus of heat to promote the fluidization of the paraffin deposit already existing within the pipeline, a hypothetical volume of treating fluid according to the SGNION-LINE mode is obtained. This volume is of the order of 136 m$^3$ of saturated C+N solution, which is able to yield $40 \times 10^6$ kilocalories. The resulting heat will cause a rise in temperature within the pipeline of the order of 93° C., which, together with the solvency effect of the oil and the fluid-mechanical effect of the nitrogen gas, is sufficient to promote the irreversible fluidization of the paraffin deposit.

The thermal balance in the oil export and in the treatment of the oil export pipeline is summarized below.

A) HEAT LOST IN THE OIL EXPORT

HEAT=680m$^3$×0.878kg/l×0.66kcal/kg°C.×(75°−14° C.)=HEAT LOST=24,036,000kCAL

B) HEAT GENERATED IN THE TREATMENT OF THE PIPELINE

HEAT=136m$^{3*}$×4.5mol/L×75Kcal/L×0.88molelmole=GENERATED HEAT=40,392,000Kcal

C) AVERAGE TEMPERATURE DURING THE TREATMENT**

40,932,000−24,036,000=680×0.80×0.878×0.66×(Teq−75)+680×0.20×1.1×1.0(Teq−25)=93° C.

\* Considering the characteristics of the pipeline treatment according to the SGN- ON-LINE mode, a volume of C+N solution (136 m$^3$) was established. This volume was considered adequate to the working and tanking capacity of the rig as well as to the thermal need of the pipeline section to be treated.

\*\* Aiming at simplifying the calculations for the average temperature of the treating fluid as well as the operation safety, it was conservatively assumed that the thermal loss during the treatment in the SGNION-INE mode would be approximately equal to the loss observed during the oil export. Further numerical simulation will be effected in order to calculate the actual temperature figures throughout the section to be submitted to the dewaxing treatment.

According to the preferred mode of the present invention, the dewaxing treatment to be effected on the oil export pipeline comprises preparing and then pumping the aqueous salt solution C+N or S+N into the flow of exported oil, after a previous reduction in the oil flowrate. This reduction is of the same order of the SGN inlet flowrate. The pumping of the C+N solution can be effected by way of a triplex pump of positive displacement, the flowrate of which is scheduled to be 1.75 barrels per minute (bpm). The activator dosage as an acidic emulsion is effected on flow and preferably in the mixture oil/C+N solution, by way of an incremental pump working in the range of 0.5 to 1.5 gallons/minute. According to this mode, the overall pumping period takes approximately 9.5 hours. In operating the dewaxing treatment according to the present process, there is no need for a final displacement of fluids neither shut in time for the completion of the chemical reaction between the nitrogen salts.

The operation details are summarized below.

| | |
|---|---|
| OPERATION MODE | CONTINUOUS, CO-CURRENT FLOW |
| ORGANIZATION OF OPERATION | REDUCTION OF THE ORIGINAL FLOW OF OIL TO 80% |
| PUMPING DIRECTION | RIG-PIPELINE-SUBSEA MONOBUOY-MONOBUOY-TANKER |
| FINAL POSITION OF TREATING FLUID | RISER-MONOBUOY (21,000 METERS) |
| TREATING FLUID ACTIVATION | C + N SOLUTION/OIL + ACID EMULSION ON FLOW AND MODERATE DELAY (20–40 MIN) |

The composition and making of the treating fluids, that is, C+N solution and acid emulsion should obey the conventional procedures as taught in the Background Information chapter. Special care should be devoted to the control of the final pH of the salt solution and to the stability of the activating acid emulsion. According to the present invention a pilot test under semi-adiabatic conditons should be effected. For this test, samples of the prepared fluids and oil kept at the outlet temperature of the separator should be used.

Also, it should be noted that the temperature of the fluid resulting from the dewaxing treatment should be sampled on flow so as to keep the dewaxing treatment under control. The sampling of the spent fluid as it arrives at the tanker should equally be carefully undertaken.

Once stored in the tanker, the paraffin content of the petroleum blend no longer constitutes a problem, since the volumes are large enough. The eventual deposition of paraffin will occur on the ship's pavement and can be easily withdrawn by mechanical means.

The dimensioning of the dewaxing treatment is summarized below.

| | |
|---|---|
| TREATING VOLUME | 680 m$^3$ (equivalent to 100% of the nominal volume) |
| NUMBER OF STAGES* | 01 |
| ORGANIC SOLVENT | PETROLEUM BLEND (WELLS 1, 2 AND 3) |
| SOLVENT PERCENTAGE | 80% BY VOLUME (544 m$^3$) |
| SALT SOLUTION | C + N SOL. 4.5 molar (OR S + N SOL.) |
| PERCENTAGE OF SOLUTION | 20% BY VOLUME (136 m$^3$) |
| EFFECTIVE CONCENTRATION | 0.9 MOLAR |
| REACTION ACTIVATOR | ACETIC ACID EMULSION @ 20% |
| ACTIVATOR DOSAGE | 1 VOLUME % BASED ON THE VOL. OF C + N SOL. |
| FLOWRATE OF TREATING FLUID | 7.50 BARRELS PER MINUTE (TOTAL) |
| PETROLEUM FLOWRATE | 6.0 BARRELS PER MINUTE |
| C + N SOL. FLOWRATE | 1.5 BARRELS PER MINUTE |
| ACTIVATOR FLOWRATE | 0.63 GRAMS PER MINUTE |
| PUMPING PERIOD | 9.50 HOURS |
| SHUT IN PERIOD | ZERO |
| MAXIMUM TEMPERATURE | 98° C. @ ADIABATIC; 93° C. (@ CALCULATED) |
| MAXIMUM PRESSURE | 690 PSI (@ NUMERICAL SIMULATION) |

It should be noted that the pumping period is a function of the treating fluid volume to be injected into the oil export pipeline. This volume will be a function of the paraffination condition of the pipeline. In the beginning of the treatment pumping is more sluggish, then when the paraffin mass is being incorporated into the petroleum oil pumping becomes easier, so that in the average the pumping period corresponds to the volume of fluid which can flow through the pipeline.

An additional advantage of the present dewaxing process as compared to the state-of-the-art processes is that the shut in time is zero, that is, no need to shut in the pipeline. This is because the dewaxing system works instantaneously—there is no waiting period for the dewaxing system to effect the treatment. This performance is not known nor suggested in the existing literature.

The composition and preparation of the treating fluids according to the present invention are set forth below.

| SOLUTION C + N (136 m$^3$) - Hypothesis I | |
|---|---|
| INDUSTRIAL WATER | 88.5 m$^3$ |
| AMMONIUM CHLORIDE | 32.8 TONS |
| SODIUM NITRITE | 42.2 TONS |
| SODIUM HYDROXIDE | 150 KG (to pH 7.0) |
| SOLUTION S + N (136 m$^3$) - Hypothesis II | |
| INDUSTRIAL WATER | 272 LITERS |
| ACETIC ACID 100% | 272 LITERS |
| DIESEL OIL | 816 LITERS |
| SURFACE AGENT | 13.6 LITERS |
| SGN/ON-LINE (680 m$^3$) | |
| SOLUTION C + N (OR SOLUTION S + N) | 136 m$^3$ |
| PETROLEUM OIL | 544 m$^3$ |
| ACIDIC EMULSION | 136 m$^3$ |

The performance of the petroleum oil blend as a solvent for the thermo-chemical dewaxing process of the oil export pipeline of a platform of the Campos Basin in the state of Rio de Janeiro, Brazil is an evidence that the SGNION-LINE process is technically feasible and economically viable. The numerical simulation and the tests of reaction kinetics employing an on-flow mixture of 80/20 vol/vol of petroleumlC+N solution stress the possibility of full withdrawal of the organic deposit possibly present in the first half of the 21,000 meters length of the pipeline.

It should be pointed out that the salt solution can be prepared based on ammonium chloride (C+N solution) or ammonium sulfate (S+N solution) or even mixtures of same, provided that be obeyed the molar proportion between the salts.

Therefore, the present thermo-chemical process for the dewaxing of oil export pipelines provides for the withdrawal of paraffin deposits from these pipelines in a very economical way since oil production is not interrupted. Also, there are significant savings in energy in view of the fact that the heat of the as-produced oil is made part of the process.

By applying the present dewaxing process according to the operation conditions as described in the specification and claims of the present invention provided for the increase in the flowrate of the oil export pipeline under study from 1700 cubic meters a day to 2400 cubic meters a day as expected. This has been attained at low cost and nearly without any production loss during the dewaxing treatment.

I claim:

1. A thermo-chemical process for the on-line dewaxing of oil export pipelines with the aid of a Nitrogen Generating System, which comprises the following steps:
   a) determining the WAT (Wax Appearance Temperature) on samples of the as-produced petroleum oil, identifying the paraffination phenomenon as well as the location of same in the oil export pipeline;
   b) determining the optimum amount of petroleum oil to be employed as solvent for the paraffinic mass present in the oil export pipeline, so as to dimension the dewaxing operation;
   c) preparing heat- and nitrogen gas- generating salt solutions and effecting dewaxing pilot test;
   d) preparing a solution of delayed-action activator;
   e) continuously pumping, from the production platform to the waxed oil export pipeline the treating fluid made up of the nitrogen salts solution, petroleum oil and delayed-action activator in the amounts determined in c) so as to effect the on-line dewaxing of the oil export pipeline while petroleum is being produced; and
   f) after the end of the pumping, collecting in a terminal the spent fluid resulting from the treatment, paraffin-rich oil and the aqueous spent solution in fluidized form.

2. A process according to claim 1, wherein the sampling of step a) is effected on the petroleum oil of various producing wells, as well as on the petroleum oil of the separator of the production platform.

3. A process according to claim 1, wherein the efficacy of the solvency of the as-produced oil is ascertained by determining the weight ratio of petroleum oil to paraffinic mass required to fluidize the paraffin deposit at a certain temperature.

4. A process according to claim 1, wherein the petroleum oil employed in the treating fluid is the as-produced petroleum oil in the field, such as the petroleum oil of the platform separator.

5. A process according to claim 1, wherein the heat- and nitrogen gas-generating solution of nitrogen salts comprises ammonium chloride and sodium nitrite in equimolar amounts in a concentration of up to 4.5 molar in each of the salts, and an activator.

6. A process according to claim 1, wherein the heat- and nitrogen gas-generating solution of nitrogen salts is a solution which comprises ammonium sulfate and sodium nitrite in equimolar amounts in a concentration of up to 4.5 molar in each of the salts, and a delayed-action activator.

7. A process according to claims 5 or 6, wherein the delayed-action activator is acetic acid at 100% in a volume amount of 0.15 to 0.50 based on the total volume of the treating fluid.

8. A process according to claim 7, wherein the preferred volume amount of the acetic acid delayed action activator is 0.2% based on the total volume of the treating fluid.

9. A process according to claims 5 or 6, wherein the delayed-action activator is a water-in-oil emulsion where the internal phase of the emulsion is acetic acid at 100% and water while the external phase of the emulsion is an aliphatic hydrocarbon, emulsified in a surface agent.

10. A process according to claim 9, wherein the surface agent is a lipophilic surface agent.

11. A process according to claim 10, wherein the lipophilic surface agent is a sorbitan ester, used in amounts of from 0.5 to 1.5 volume % based on the total volume of activator.

12. A process according to claim 9, wherein the volume amount of water and the volume amount of acetic acid in the internal phase of the emulsion are the same.

13. A process according to claim 9, wherein the aliphatic hydrocarbon which constitutes the external phase of the water-in-oil emulsion can be a hydrocarbon in $C_5$–$C_7$ such as pentane, hexane or heptane.

14. A process according to claim 9, wherein the external phase of the water-in-oil emulsion can be a petroleum fraction such as diesel oil.

15. A process according to claim 9, wherein the aliphatic hydrocarbon is diesel oil and the volume amount of acetic acid/water/diesel oil of the water-in-oil emulsion of the activator can vary of from 12.5/12.5/75 and up to 37.5/37.5/25, respectively.

16. A process according to claim 15, wherein the preferred volume amount of acetic acid/water/diesel oil in the water-in-oil emulsion is 20/20160, respectively.

17. A process according to claim 12, wherein the aliphatic hydrocarbon is diesel oil and the volume amount of acetic acid/water/diesel oil of the water-in-oil emulsion of the activator can vary of from 12.5/12.5/75 and up to 37.5/37.5/25, respectively.

18. A process according to claim 13, wherein the aliphatic hydrocarbon is diesel oil and the volume amount of acetic acid/water/diesel oil of the water-in-oil emulsion of the activator can vary of from 12.5/12.5/75 and up to 37.5/37.5/25, respectively.

* * * * *